(12) United States Patent
Zwinkels (10) Patent No.: US 9,683,491 B2
(45) Date of Patent: Jun. 20, 2017

(54) POWER PLANT AND METHOD FOR GENERATING ELECTRICAL POWER

(71) Applicant: LUMENION AG, Zug (CH)

(72) Inventor: Andrew Zwinkels, Berlin (DE)

(73) Assignee: Lumenion AG, Zug (CH)

( * ) Notice: Subject to any disclaimer, the term of this patent is extended or adjusted under 35 U.S.C. 154(b) by 532 days.

(21) Appl. No.: 14/229,697

(22) Filed: Mar. 28, 2014

(65) Prior Publication Data

US 2014/0290267 A1 Oct. 2, 2014

(30) Foreign Application Priority Data

Mar. 28, 2013 (EP) ..................................... 13001609

(51) Int. Cl.
*C10J 3/00* (2006.01)
*F02C 7/32* (2006.01)
*F02C 3/28* (2006.01)

(52) U.S. Cl.
CPC . *F02C 7/32* (2013.01); *F02C 3/28* (2013.01)

(58) Field of Classification Search
CPC ...... F02C 7/32; F02C 3/00; F02C 3/28; F02C 3/20; F02C 3/22; F02C 3/26; C10J 3/00; Y02E 20/18
See application file for complete search history.

(56) References Cited

U.S. PATENT DOCUMENTS

| 3,241,933 A | * | 3/1966 | Ploum | ...................... C01B 3/22 252/373 |
| 3,446,747 A | * | 5/1969 | Bongiorno | ................. B01J 8/06 252/373 |
| 3,795,485 A | * | 3/1974 | Bogart | .................... C01B 3/382 252/373 |

(Continued)

FOREIGN PATENT DOCUMENTS

CN 101922356 A 12/2010
EP 1122296 A2 8/2001

(Continued)

OTHER PUBLICATIONS

European Search Report; EP13001609; Sep. 19, 2013.

(Continued)

*Primary Examiner* — Brian D Nash
(74) *Attorney, Agent, or Firm* — Studebaker & Brackett PC (57) ABSTRACT

The present invention relates to a power plant to generate electrical power, having a reformer unit, in which an energy carrier can be converted, with the supply of heat, into combustion fluid, wherein the reformer unit has a reformer burning device to provide a heat supply, with which reformer burning device an energy carrier can be burnt, a burner unit, in which thermal energy can be produced by burning the combustion fluid, a turbine unit, in which a rotational movement can be produced with the thermal energy, and a generator unit which can be driven by the (Continued)

rotational movement to generate electrical power. The power plant is characterized according to the invention in that, in order to provide a heat supply, in addition to the reformer burning device, an electric heating unit is provided, through which electrical energy can be converted into heat energy.

12 Claims, 6 Drawing Sheets

(56) References Cited

U.S. PATENT DOCUMENTS

| | | | | |
|---|---|---|---|---|
| 4,733,528 | A * | 3/1988 | Pinto | C01B 3/025 252/376 |
| 5,174,107 | A * | 12/1992 | Ogawa | C10J 3/00 122/7 B |
| 5,264,202 | A * | 11/1993 | Snyder | B01J 23/755 423/652 |
| 5,590,518 | A * | 1/1997 | Janes | F01D 1/00 60/39.12 |
| 6,200,403 | B1 | 3/2001 | Thomas et al. | |
| 6,200,430 | B1 * | 3/2001 | Robert | C10J 3/00 204/164 |
| 6,201,029 | B1 * | 3/2001 | Waycuilis | C01B 3/382 252/373 |
| 6,838,071 | B1 * | 1/2005 | Olsvik | F25J 3/04539 423/437.2 |
| 7,634,915 | B2 * | 12/2009 | Hoffmann | C01B 3/38 60/39.12 |
| 7,931,888 | B2 * | 4/2011 | Drnevich | C01B 3/16 423/650 |
| 8,167,960 | B2 * | 5/2012 | Gil | C01B 3/36 252/373 |
| 8,567,200 | B2 * | 10/2013 | Brook | C01B 3/382 60/39.182 |
| 8,893,505 | B2 * | 11/2014 | Mokheimer | F02C 1/05 60/39.12 |
| 8,984,857 | B2 * | 3/2015 | Minta | F01K 23/068 166/402 |
| 2002/0155043 | A1 * | 10/2002 | Yakobson | C10G 2/00 422/186.29 |
| 2005/0107482 | A1 * | 5/2005 | Van Egmond | C07C 1/20 518/726 |
| 2005/0144961 | A1 * | 7/2005 | Colibaba-Evulet | C01B 3/36 60/780 |
| 2007/0253874 | A1 * | 11/2007 | Foret | C02F 1/006 422/186.07 |
| 2010/0175320 | A1 | 7/2010 | Schuetzle | |
| 2012/0312018 | A1 * | 12/2012 | Anderson | F22B 1/1815 60/645 |

FOREIGN PATENT DOCUMENTS

| | | |
|---|---|---|
| EP | 2218889 A2 | 8/2010 |
| RU | 2168806 C2 | 6/2001 |
| RU | 2222492 C2 | 1/2004 |
| WO | 2012/118511 A1 | 9/2012 |

OTHER PUBLICATIONS

An Office Action; "Notice of Preliminary Rejection," issued by the Korean Patent Office on May 31, 2016, which corresponds to Korean Patent Application No. 10-2014-0036738 and is related to U.S Appl. No. 14/229,697; with English language translation.

* cited by examiner

POWER PLANT AND METHOD FOR GENERATING ELECTRICAL POWER

The invention relates in a first aspect to a power plant for generating electrical power.

The invention relates in a further aspect to a method for generating electrical power.

A generic power plant for generating electrical power comprises a reformer unit, wherein an energy carrier can be converted, with a supply of heat, into combustion fluid, wherein the reformer unit has a reformer burning device to provide a heat supply, with which reformer burning device an energy carrier can be burnt. The power plant further comprises a burner unit, wherein thermal energy can be generated by burning the combustion fluid, a turbine unit, wherein a rotational movement can be produced with the thermal energy, and a generator unit which can be driven by the rotational movement to generate electrical power.

According to a generic method for generating electrical power, an energy carrier is converted in a reformer unit—with a supply of heat—into combustion fluid. An energy carrier is burnt with a reformer burning device to provide the heat supply. The combustion fluid is burnt in a burner unit and thus generates thermal energy. The thermal energy is converted into a rotational movement in a turbine unit. A generator unit is driven by the rotational movement and electrical power is hereby generated. Such a method can be carried out for example with a generic power plant.

In many countries, a significant proportion of the whole electrical energy supply is obtained with power plants of the aforementioned type. The energy carriers used can differ depending upon the power plant and comprise, for example, coal, gas or oil. These are converted by the reformer unit into the combustion fluid, which can for example be a synthesis gas.

The reformer unit can be in particular a coal gasification unit. By supplying heat, powder-form coal is converted in this coal gasification unit into synthesis gas. This is also described as syngas and is a hydrogen-containing gas mixture. The reaction can be described by:

$$C+H_2O \rightarrow CO+H_2 +175.4 \text{ kJ}.$$

Subsequently the synthesis gas ($CO+H_2$) can be burnt in the burner unit, whereby thermal energy is released:

$$CO+H_2+O_2 \rightarrow CO_2+H_2O -568.8 \text{ kJ}.$$

In a similar way, the reformer unit can also be a gas reformer which—with the supply of Heat—converts natural gas, that is to say methane, into synthesis gas:

$$CH_4+H_2O \rightarrow CO+3H_2 +250.1 \text{ kJ}.$$

The synthesis gas can then likewise be burnt in order to release thermal energy:

$$CO+3H_2+2.5O_2 \rightarrow CO_2+3H_2O -1140.1 \text{ kJ}.$$

Instead of water, carbon dioxide can also be used in the reformer unit to convert coal or gas:

$$C+CO_2 \rightarrow 2CO +172.5 \text{ kJ}$$

or $$CH_4+CO_2 \rightarrow 2CO+2H_2 +247.3 \text{ kJ}.$$

By initially expending energy to obtain syngas and subsequently releasing energy by burning the syngas, all in all a similar amount of energy can be used as in conventional, non-generic power plants which directly burn coal or natural gas to obtain thermal energy:

$$C+O_2 \rightarrow CO_2 -393.5 \text{ kJ}$$

or $$CH_4+3O_2 \rightarrow CO_2+2H_2O -890 \text{ kJ}.$$

The invention takes into consideration that a growing proportion of the total amount of power generated is covered by renewable energy sources. In particular, solar energy and wind energy are increasingly used for power generation. However, the amount of energy hereby generated greatly fluctuates over time. There are scarcely any facilities for large-scale storage of the surplus electrical energy hereby produced. How surplus electrical energy is to be used constitutes a difficult problem. It is not rare in times of increased power generation to even pay for the reduction of electrical energy.

In principle, it is conceivable to power down the aforementioned power plant during increased power generation through solar or wind energy. Powering down and re-starting the power plant are, however, generally associated with high material burdens. In addition, in the case of known power plants, they can only be carried out slowly. The speeds which can thereby be reached are not sufficient to be able to efficiently react to a fluctuating amount of wind or solar radiation.

It is indeed known to change the efficiency level of a power plant for more rapid adaptation of the amount of power produced by it. For this, during normal operation for example, cold vapour is added to the hot vapour, with which the turbine unit is driven. The efficiency level of the power plant is thereby lowered for example from 42% to 39%. In the case of a rapid reduction in the electrical energy obtained through renewable energy sources, the addition of cold vapour can be stopped. The efficiency level can thereby be increased to 42% in a short time. A disadvantage in this case, however, is that, during normal operation, the power plant is operated with a relatively poor efficiency level. As a result, a lot of energy which can in principle be used is lost. In addition, in this way only relatively small fluctuations in the available amount of electrical energy can be compensated.

It can thus be regarded as an object of the invention to indicate a method for generating electrical power and a power plant which facilitate an efficient adaptation to fluctuations in the amount of electrical power available.

Advantageous variants of the power plant according to the invention and the method according to the invention are also explained in the following description.

It is provided for the power plant of the abovementioned type according to the invention that, for the provision of a heat supply, an electric heating unit is provided in addition to the reformer burning device, through which electric heating unit electrical energy can be converted into heat energy.

In the method of the abovementioned type, it is provided according to the invention that the heat supply is provided, in addition to being provided by the reformer burning device, by an electric heating unit, through which electrical energy is converted into heat energy.

It can be regarded as a fundamental idea of the invention that the combustion fluid can be produced both through an energy supply from the reformer burning device and also through an energy supply from the electric heating unit.

Electrical energy is thus initially used by the electric heating unit to produce the combustion fluid. Thermal energy is then produced with this combustion fluid and is converted into movement energy and finally, with the generator unit, back into electrical energy. In times of surplus electrical energy, the power plant according to the invention can thus use a relatively large proportion of this surplus electrical energy. In such a case, the heat supply through the reformer burning device can be reduced. The reformer burning device thereby burns a smaller amount of the energy carrier. Consequently, by using the electrical energy, the energy carrier can be saved.

It is hereby possible as a particular advantage to vary the amount of the energy carrier which is burnt by the reformer burning device without hereby changing the amount of combustion fluid which is produced by the reformer unit.

It is thus possible to react particularly quickly to a rapid variation in the available amount of power in an external power network. For this purpose, the electrical energy supplied to the electric heating unit is changed, and a heating power of the reformer burning device is simultaneously adapted.

By converting electrical energy into heat energy and, via a plurality of intermediate steps, back into electrical energy, it is indeed merely possible to use approximately 40% of the original electrical energy. Nonetheless, this constitutes an extremely meaningful use of the electrical energy in comparison with the case of money even having to be spent for the reduction of surplus electrical energy.

All in all, by using electrical energy in the power plant according to the invention, a quantity of energy carrier is saved which would otherwise be burnt. The power plant thus works like a storage unit which uses surplus electrical energy to increase the available amount of energy carrier.

In a preferred embodiment of the invention the combustion fluid which can be produced with the reformer unit is synthesis gas, as described above. In order that amounts of electrical energy which are as large as possible can be meaningfully used by the electric heating unit, such energy carriers as those requiring a particularly high heat supply are preferably converted into a combustion fluid in the reformer unit. The energy hereby supplied can for the large part be recovered if the combustion fluid is burnt with the burner unit.

According to a preferred variant the reformer unit is a coal gasification or liquefaction unit. Here, coal is thus the energy carrier which is converted into combustion fluid and also used by the reformer burning device to provide a heat supply.

Alternatively or additionally, the reformer unit can also comprise a gas reformer, with which a gas can be converted as an energy carrier into the combustion fluid. The gas can for example be natural gas.

In principle, the reformer unit can be understood to be any device which, through an energy supply with an energy carrier, produces a combustion fluid. Apart from coal and natural gas, any organic substances can also be used in principle as energy carriers. By burning the combustion fluid, more energy should usefully be released than by burning the energy carrier.

The heat supply from the electric heating unit to the reformer unit can in principle be realised in any way.

According to a preferred embodiment the reformer unit has a heat exchanger. Heat energy can be transferred to the energy carrier with this heat exchanger. The heat exchanger can thereby be used both by the reformer burning device and by the electric heating unit to output heat energy. A heat exchanger can thereby be advantageously used which is already present in conventional reformer units. It is merely necessary to add a connection for the electric heating unit to the heat exchanger. Using this connection, a medium, for example a gas, which is heated by the electric heating unit, can be forwarded to the heat exchanger.

Alternatively, the heat exchanger can also be used solely by the reformer burning device. The electric heating unit can then transfer heat in another way to the energy carrier.

The electric heating unit can in turn convert electrical energy into heat energy in principle in any way.

For example the electric heating unit can have electrical resistor elements to convert electrical energy into heat energy. If the resistor elements are used to heat a medium supplied to the heat exchanger of the reformer unit, a minor subsequent adaptation of conventional power plants can be realised. Alternatively, the resistor elements can, however, also be arranged adjacent to the heat exchanger. They can thereby directly output heat to the energy carrier and can be used independently of the heat exchanger. A redundancy is thereby achieved which reduces a shutdown risk of the whole power plant.

Alternatively or additionally, the electric heating unit can also have a plasma torch to heat a medium, from which heat can be transferred to the energy carrier in order to convert it into combustion fluid. In the case of a plasma torch, a gas is converted into a plasma. The plasma is accelerated with the aid of an electric field, whereby the thermal energy thereof increases. High temperatures can advantageously hereby be reached rapidly. In addition, a plasma torch can have a compact structure and is thereby suited for subsequent adaptation of conventional power plants.

The electric heating unit can alternatively or additionally have induction means for heating a medium. A heating power of the induction means can be controlled by changing a magnetic resistance on the induction means. For example the induction means can comprise one or more coils. These produce a magnetic field which is fed via a conductive material to the medium to be heated. An air gap can be varied on the conductive material, whereby the magnetic resistance is adjusted. The power supplied to the medium to be heated can thereby be easily controlled over a large area.

It is particularly preferable to provide a control unit, with which a heating power of the electric heating unit can be increased and, in particular simultaneously, a heating power of the reformer burning device can be reduced, and vice versa. The heating powers of the electric heating unit and the reformer burning device can thus be changed in an opposing manner to each other.

The control unit can be adapted, in dependence upon the available amount of electrical energy in an external power network, to increase the heating power of the electric heating unit and to reduce the heating power of the reformer burning device. Accordingly, the control unit can be designed to set the heating power of the electric heating unit increasingly higher, the greater the amount of electrical energy that is available. This amount can for example be manually input by a user. Alternatively, the amount of electrical energy can be automatically detected by the control unit. In particular, the available amount of electrical energy can be detected using the respectively present power price. If the present power price falls below a predefined threshold, the heating power of the electric heating unit can be increased.

The adjustment of the heating power of the electric heating unit can thus be realised in dependence upon the present power price. This can be manually input or be automatically retrieved with the control unit, in particular from a power market. The higher the heating power of the electric heating unit is set, the lower the heating power of the reformer burning device can be set.

In particular the heating powers of the electric heating unit and the reformer burning device can be controlled by the control unit in dependence upon each other in such a way that the rate at which combustion fluid is produced remains constant. Alternatively, the control can be realised so that the rate changes at most by a predefined maximum change rate. The functioning capacity of the burner unit, the turbine unit and the generator unit is independent of whether the combustion fluid has been produced with heat energy from the electric heating unit or the reformer burning device. The ratio between the heating powers of the electric heating unit and the reformer burning device can thus advantageously be changed very rapidly without this having undesirable effects upon the burner unit, the turbine unit or the generator unit.

These units allow merely a comparatively slow change in the electrical power generated by the generator unit. Nevertheless, this slowly facilitated change can also be used. For this purpose, the control unit does not maintain the sum of the heating powers of the electric heating unit and the reformer burning device constant all the time. Instead, the sum of the heating powers can be reduced if the electric heating unit is activated and/or the heating power of the electric heating unit is increased. The total heating power can therefore be reduced only by a predefined maximum change rate.

Alternatively or additionally, the heating powers of the electric heating unit and the reformer burning device can be controlled by the control unit in dependence upon each other in such a way that a temperature in the reformer unit lies in a predefined target range, in which the energy carrier can be converted into combustion fluid. A present heating power of the reformer burning device is thus adapted to a present heating power of the electric heating unit so that a predefined temperature range is constantly maintained in the reformer unit.

In principle, a storage container can also be provided which can store a medium which has been heated by the electric heating unit. The storage container is filled if the available amount of electrical energy exceeds a predefined threshold value. If the amount of the available electrical energy falls, the storage container can be emptied. The amount of energy carrier which must be burnt by the reformer burning device to obtain heat can thus be further reduced.

Alternatively or additionally, a storage container can also be provided, in which the combustion fluid produced can be stored. In case of an increase in the available amount of electrical energy, therefore, in this configuration the rate, at which combustion fluid is produced, can be increased. Combustion fluid from the storage container can be fed to the burner unit when the available amount of electrical energy falls. The amount of energy carrier which must be burnt with the reformer burning device to generate heat can thereby likewise be reduced. In this respect, the storage unit can serve as a buffer, through which a constant amount of combustion fluid is output to the burner unit even if the incoming amount of combustion fluid fluctuates.

By using the storage container the reformer burning device does not burn already larger amounts of the energy carrier if the heating power of the electric heating unit is reduced. Instead, the amount of the energy carrier is only increased when a fill level in the storage container falls below a predefinable threshold value or falls to zero.

The control unit is preferably adapted, in case of a reduction in the heating power of the electric heating unit below a predefinable threshold value or zero, to trigger a transfer of the heated medium from the storage container. Likewise, a transfer is triggered if a predefined maximum degree of filling of the storage container is reached. In this case the amount of the energy carrier fed to the reformer burning device is simultaneously reduced. The turbine unit can thereby continue to be operated with substantially constant total power. A change in the heating power of the electric heating unit is not necessary in this case.

Alternatively or additionally, it can also be provided that combustion fluid from the storage container is not transferred or is not completely transferred to the burner unit. Instead, it can be used for other processes. If the combustion fluid is a synthesis gas, this can be used for example in a method for coal liquefaction or gasification, in particular in the Fischer-Tropsch process.

In principle, the inventive idea can also be used for any reformer units which are not part of a power plant. It can also be provided in the case of such a reformer unit that a heat supply is possible both through a reformer burning device and also through an electric heating unit. The variants described for the power plant can also be used for this reformer unit. In contrast with the power plant, it is merely the case that no burner unit, turbine unit or generator unit are present. Instead, the reformer unit can for example be part of an installation for gas and/or liquid production. In particular it can be an installation for obtaining molecular hydrogen $H_2$. Alternatively or additionally, the installation can be designed to carry out a method for coal gasification or liquefaction. This also includes the Fischer-Tropsch process, with which methane, methanol and alkane can be produced.

The essential idea of the invention can also be used in general in plants which provide heat energy with a burner device by burning an energy carrier. For example such a plant can be a cement works, in which heat energy is required for cement production, said heat energy being provided by burning the energy carrier. According to the inventive idea an electric heating unit is also used here. The control unit can set the proportions in which heat energy is provided by the electric heating unit and by the burner device. The burner device can be designed like the reformer burning device. The control unit and the electric heating unit can be designed as described for the power plant. In particular the control can be such that a constant total heat energy or quantity is always released for different ratios between the heat energy from the electric heating unit and the heat energy of the burner device. The heating power of the electric heating unit can be selected to be higher, the lower the present power price is.

Further features and advantages of the invention are described below by reference to the attached schematic drawing, in which.

Identical components and those working identically are as a rule provided with the same reference symbols in the figures.

Figure 1:
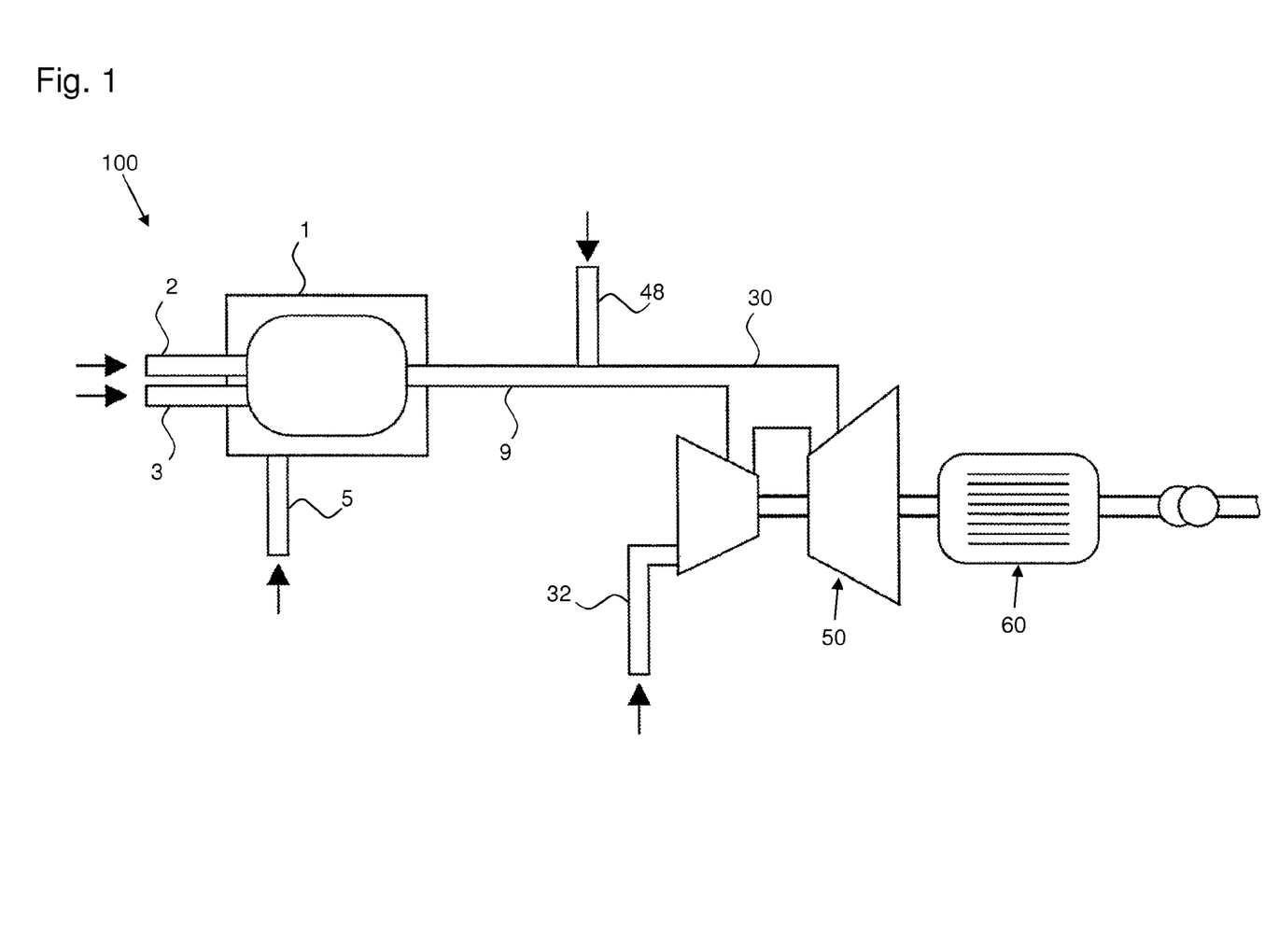
FIG. 1 shows an exemplary embodiment of a power plant according to the invention, wherein natural gas is used as an energy carrier.

FIG. 1 shows, schematically, an exemplary embodiment of a power plant 100 according to the invention. This has the following essential components: a reformer unit 1, a burner unit 30, a turbine unit 50 and a generator unit 60. In addition, a reformer burning device 10 and an electric heating unit 20 are used, which are not shown in FIG. 1 and are described in greater detail below.

The reformer unit 1 has inlets 2, 3 for an energy carrier. For example a gas such as, for example natural gas, and water can be introduced into the reformer unit 1 via the inlets 2 and 3. In the reformer unit 1, the energy carrier is converted into a combustion fluid. Natural gas and water are converted for example into carbon monoxide and molecular hydrogen. This gas mixture is also described as synthesis gas.

By means of an outlet 9 the combustion fluid, that is to say the synthesis gas, is conveyed from the reformer unit 1 to the burner unit 30.

A further supply line 48 can be provided, with which natural gas is fed to the burner unit 30 in addition to the synthesis gas.

In the burner unit 30, the combustion fluid and any present natural gas are burnt, whereby thermal energy is produced. The turbine unit 50 is thereby driven. Air can be supplied via an inlet 32.

Through a rotational movement of the turbine unit 50, finally, the generator unit 60 can generate electrical energy.

In order that the energy carrier can be converted in the reformer unit 1 into the combustion fluid, thus natural gas can be converted into synthesis gas, an energy or heat supply is necessary. Means 5 for energy or heat supply to the reformer unit 1 are thus provided.

In the case of conventional power plants, the means 5 are formed by a reformer burning device which burns for example natural gas in order to provide heat energy.

According to the invention, on the other hand, the means 5 also comprise, in addition to the reformer burning device, an electric heating unit.

It is thereby possible to variably set the proportions in which a desired heat energy is provided by the reformer burning device and by the electric heating unit.

Advantageously, electrical energy can thereby be used for heat generation precisely when it can be provided cost-effectively. This is the case for example if wind power plants or solar power plants temporarily produce more electrical power. If on the other hand no surplus electrical power is available, the required heat energy can be produced in a principally conventional way by burning the energy carrier.

Large amounts of surplus electrical energy can thus advantageously be used, for which otherwise there would be no meaningful use. According to the invention the rate can thereby be reduced, at which the energy carrier is burnt. A proportion of the energy carrier can thereby advantageously be saved.

The amount of energy carrier burnt per time unit can thus be varied without the electrical power generated by the generator unit being changed. The turbine unit and the generator unit can thereby be operated approximately constantly although the combustion rate of the energy carrier is changed. In contrast with conventional power plants, a maximum rate of change in the combustion of the energy carrier is no longer limited by the turbine unit and the generator unit. Very high rates of change are thus possible, with which it is possible to efficiently react to changes in the available amount of power in an external network.

Figure 2:
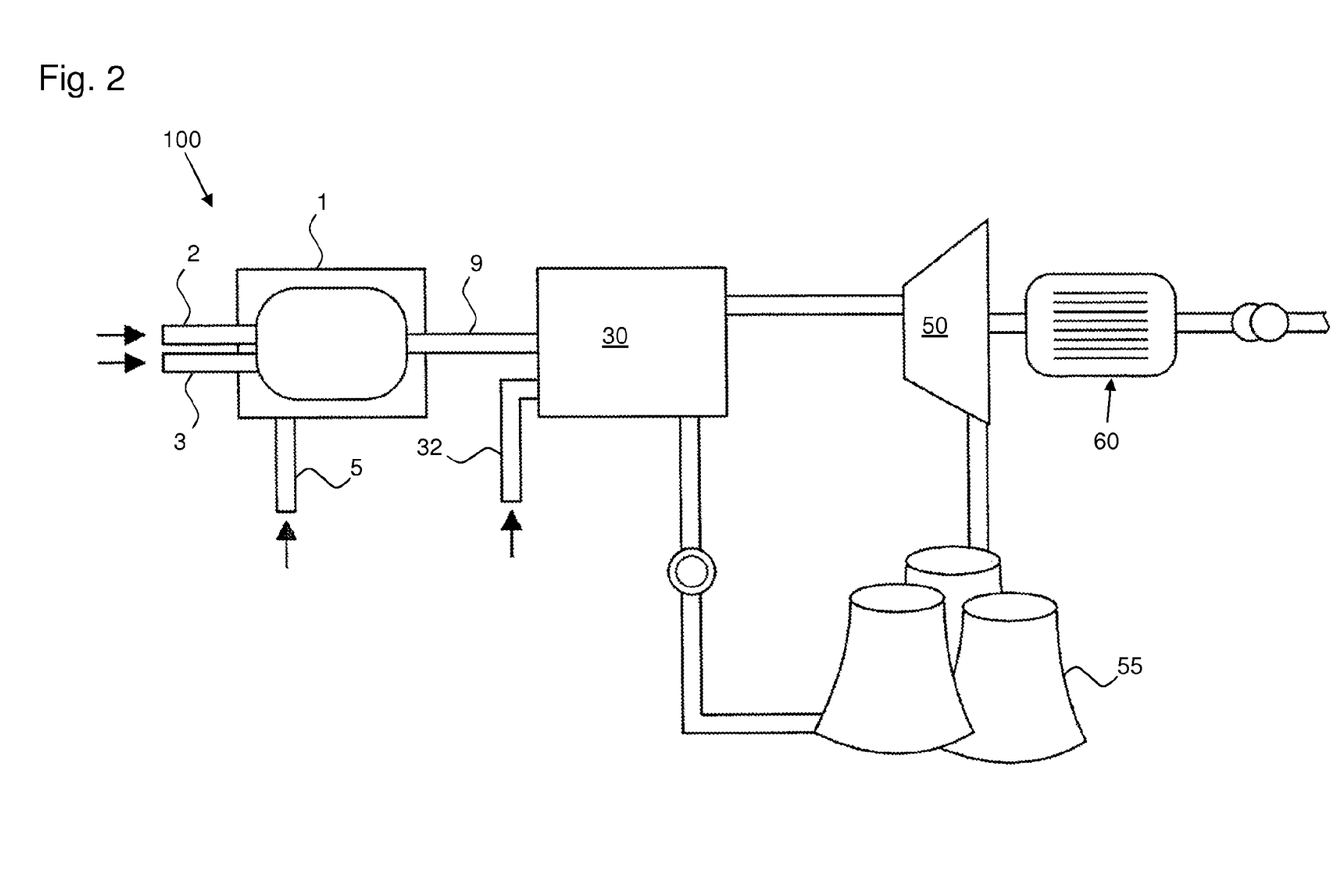
FIG. 2 shows an exemplary embodiment of a power plant according to the invention, wherein coal is used as an energy carrier.

A further exemplary embodiment of a power plant 100 according to the invention is shown schematically in FIG. 2. This power plant 100 is designed so that the reformer unit 1 uses coal, instead of natural gas, to produce synthesis gas. This is output at the outlet 9 and then burnt in the burner unit 30. The fluid thereby produced is fed to the turbine unit 50 and further to towers 55 to output waste gases and/or fed back to the burner unit 30.

In other respects, this power plant 100 can be the same as that of FIG. 1.

Figure 3:
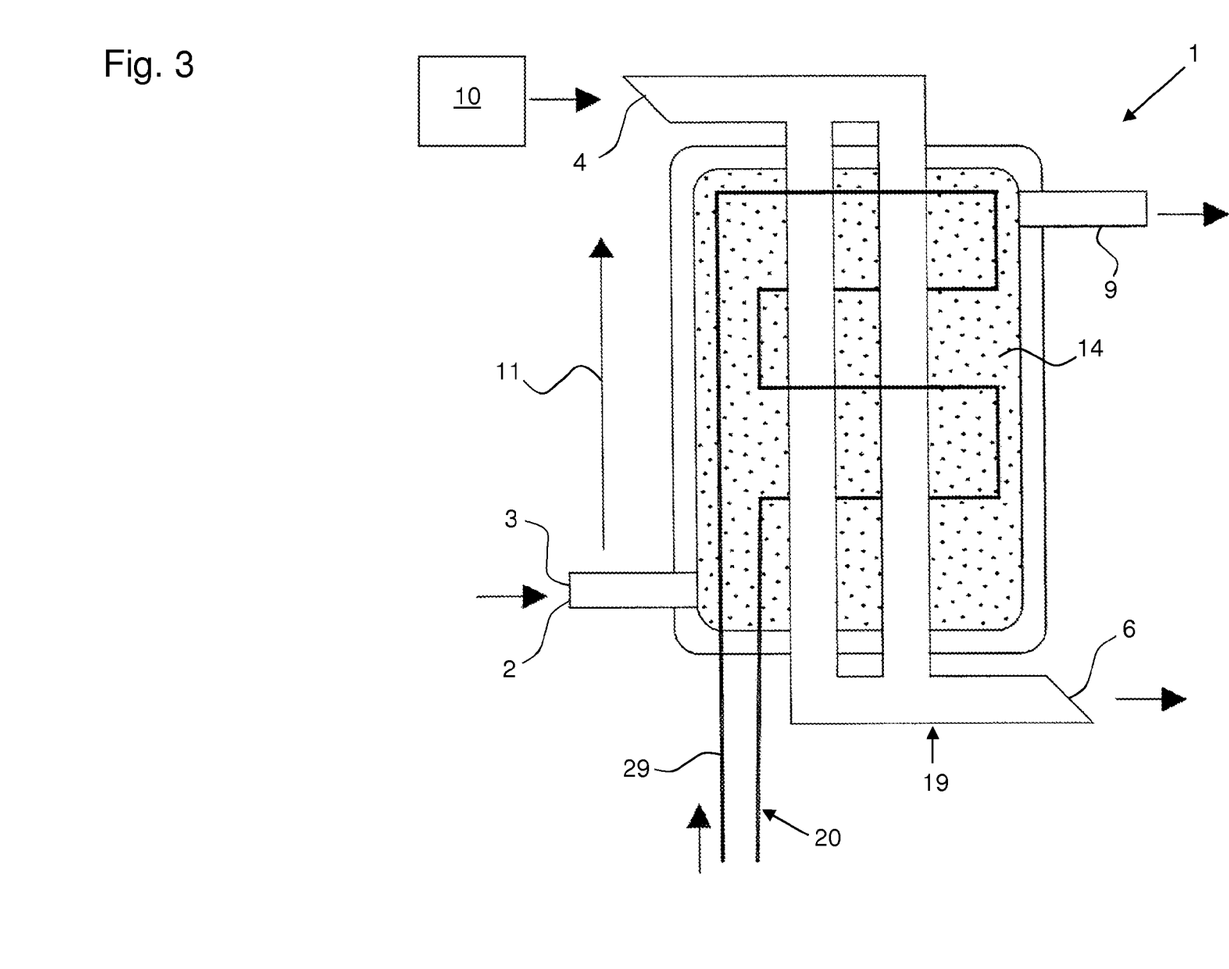
FIG. 3 shows an exemplary embodiment of a reformer unit and an electric heating unit of a power plant according to the invention.

An embodiment of a reformer unit 1 of a power plant according to the invention is shown schematically in FIG. 3. This reformer unit 1 is suited in particular to produce synthesis gas from natural gas and water. Natural gas and water are introduced into a chamber 14 of the reformer unit 1 through an inlet 2, 3. A catalyst is received there, with which the natural gas and water are converted to synthesis gas which then leaves the chamber 14 via the outlet 9.

A heat supply is required for the conversion into synthesis gas. For this purpose, on the one hand a heat exchanger 19 is present. A hot fluid flows through said heat exchanger 19 from an inlet 4 to an outlet 6, whereby it outputs heat to the media in the chamber 14. The hot fluid has been heated by a reformer burning device 10. This burns an energy carrier, which can for example be natural gas.

In principle, the reformer burning device 10 can use the same energy carrier which is also used for conversion into synthesis gas or into another combustion fluid. In the embodiment shown, natural gas is used both for heat generation with the reformer burning device 10 and also for conversion into synthesis gas. Alternatively, however, different energy carriers can also be used by the reformer burning device 10 and for conversion into synthesis gas.

As a result of the heat output by the heat exchanger 19, a temperature gradient arises in the chamber 14, wherein the temperature increases in the direction of the arrow 11. Synthesis gas can be produced through the increased temperature.

In addition, an electric heating unit 20 is also present. This has electrical resistor elements 29 which extend through the chamber 14. Heat can also hereby be output to the media in the chamber 14 in order to produce synthesis gas.

Figure 4:
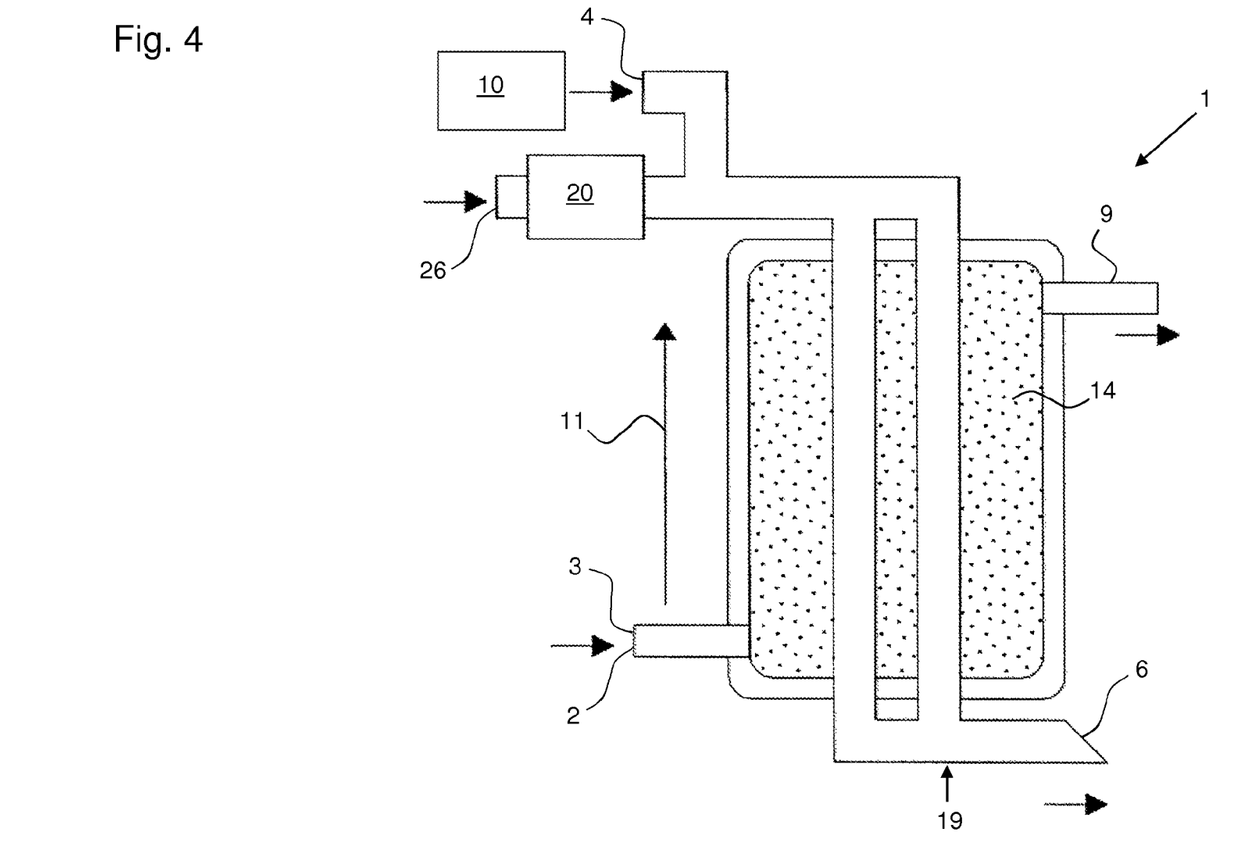
FIG. 4 shows a further exemplary embodiment of a reformer unit and an electric heating unit of a power plant according to the invention.

A further exemplary embodiment of a reformer unit 1 of a power plant according to the invention is shown schematically in FIG. 4. As in the previous example, a heat exchanger 19 is also used here, through which a hot fluid is conveyed which has been heated by the reformer burning device 10. In contrast with the preceding exemplary embodiment, however, the electric heating unit 20 here initially heats a fluid, for example air, which is introduced via an inlet 26 into the electric heating unit. The heated fluid is likewise conveyed through the heat exchanger 19. Advantageously, no further intervention in the chamber 14 is hereby necessary. In addition, conventional reformer units 1 can be particularly simply adapted. For this purpose, merely a further connection is required on the heat exchanger 19 which is already present for the heat transfer from the reformer burning device 10. The electric heating unit 20 is connected to this further connection. The electric heating unit 20 can also have in principle any design in this case. For example it can have resistive resistor elements or induction coils. In addition it can also comprise a plasma torch.

Figure 5:
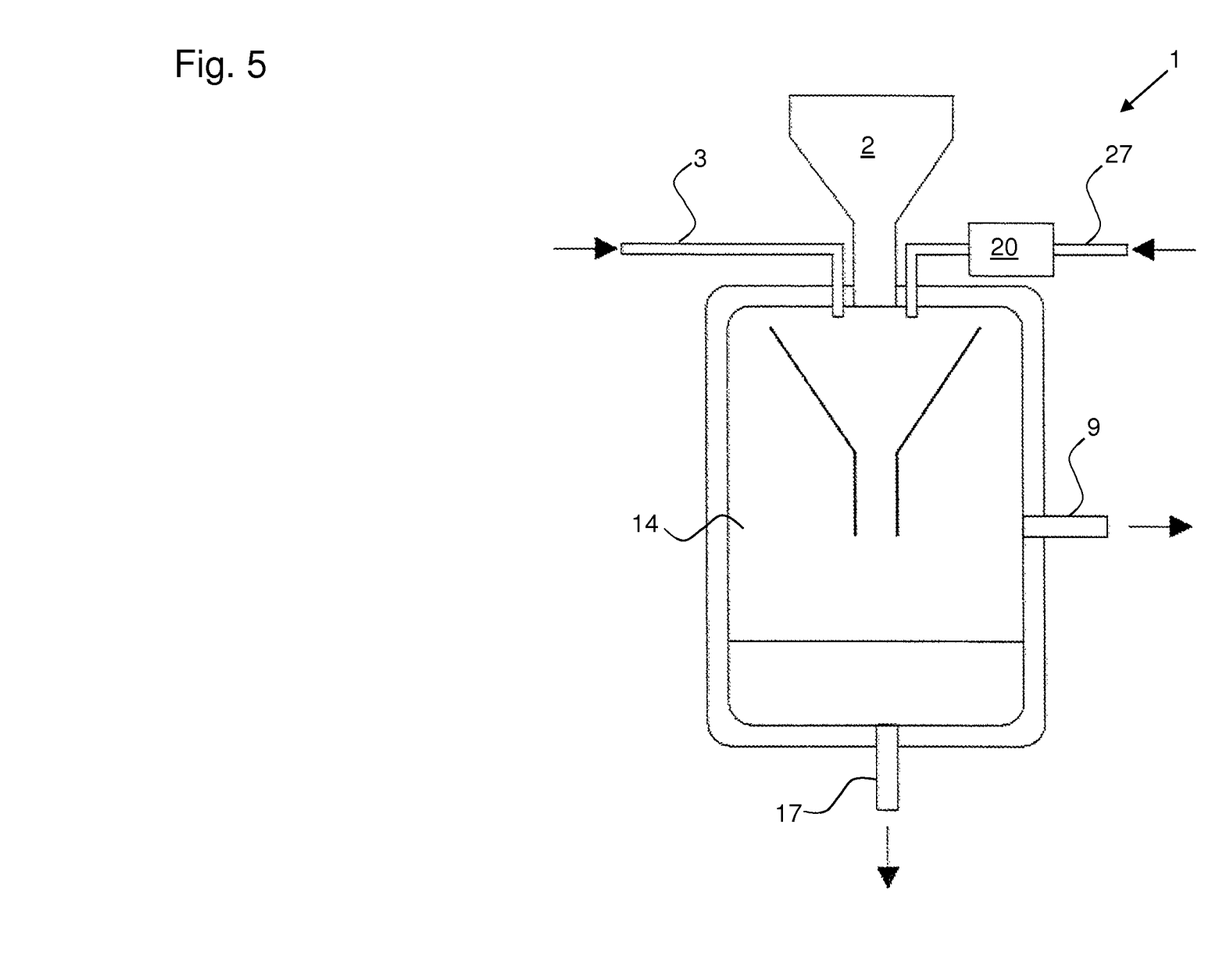
FIG. 5 shows a third exemplary embodiment of a reformer unit and an electric heating unit of a power plant according to the invention.
Figure 6:
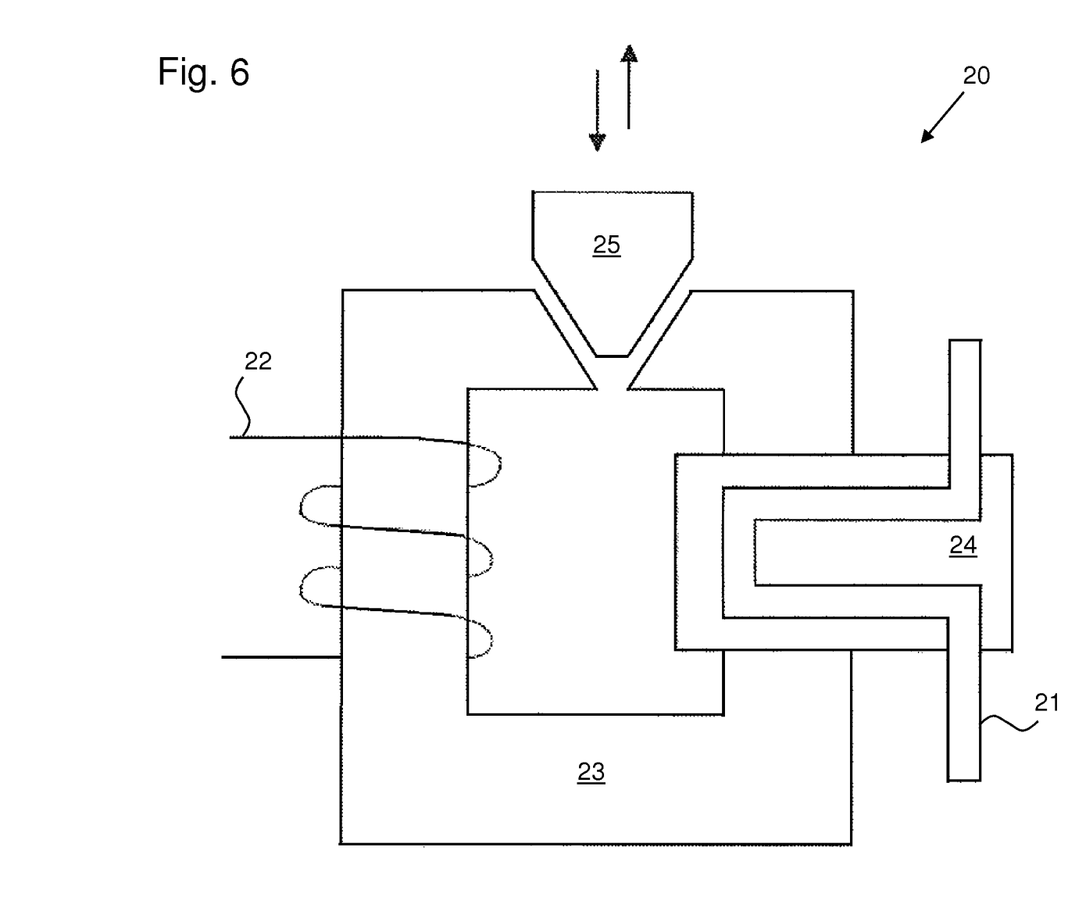
FIG. 6 shows an exemplary embodiment of an electric heating unit of a power plant according to the invention.

A further exemplary embodiment of a reformer unit 1 of a power plant according to the invention is shown in FIG. 5.

This is designed as a coal gasification unit, that is to say it can use coal as an energy carrier and convert this into synthesis gas.

For this purpose, coal is introduced via an inlet 2 and oxygen via an inlet 3 into the chamber 14. By means of a further inlet 27, water is fed to the chamber 14 in liquid or gaseous phase.

Heat energy is produced by burning a proportion of the coal 2 in the chamber 14 with the oxygen. Through this, a further proportion of the coal is converted with the water to synthesis gas. The synthesis gas is then removed through the outlet 9. Residual amounts are conveyed in a lower part of the chamber 14, which is also described as a quencher, into the solid phase and removed through an outlet 17. The reformer burning device is thus formed here by the chamber 14, in which coal is burnt with the supply of oxygen.

This reformer unit 1 differs from conventional coal gasification units through an additional electric heating unit 20. The water can be heated with this before it is introduced into the chamber 14. In particular, the water can be heated super-critically.

Insofar as the electric heating unit 20 provides thermal energy in this way, less coal needs to be burnt with oxygen in order to produce overall sufficient heat energy. A control unit can thus be adapted to adjust the amount of coal and oxygen introduced in dependence upon the heating power of the electric heating unit 20. The higher the heating power, the less coal and oxygen are introduced.

In principle, however, an electric heating unit can also be provided here, which supplies heat energy at another point. Alternatively or additionally, for example, heating elements can also be arranged within the chamber 14.

The electric heating unit can also be designed for inductive heating. An example of this is shown in FIG. 3. The electric heating unit 20 shown there initially has one or more coils 22, to which an alternating voltage is supplied. The thereby varying magnetic field is fed via a conductive material 23, for example a ferrite core 23. A medium to be heated is conveyed through a channel 21 which leads through a heat conducting material 24. Through the magnetic field, a current is induced in the material and thus heat is produced which is transferred to the medium in the channel 21. A cost-effective and rapidly adjustable possibility for converting electrical energy into thermal energy is hereby provided. The rapid adjustment is realised via a switch 25. This can close an air gap in the conductive material 23, whereby the conductive material 23 forms a closed ring. An increased guiding of the magnetic field in the conductive material 23 is thereby realised.

For the subsequent adaptation of conventional power plants, changes must advantageously merely be carried out on the reformer unit. The following units, in particular the burner unit, the turbine unit and the generator unit, can remain unchanged.

It is advantageously facilitated with the power plant according to the invention to vary the combustion rate of an energy carrier, such as for example coal or natural gas, particularly rapidly. It thus becomes possible to meaningfully use a surplus of electrical energy. As a result, fossil fuels can thereby be saved which would otherwise be burnt. As a consequence, $CO_2$ emissions are also advantageously reduced.

The invention claimed is:

1. A power plant that generates electrical power, comprising:
   a reformer unit, in which an energy carrier is converted into combustion fluid with a heat supply, wherein the reformer unit has, for the purpose of providing the heat supply, a reformer burning device, with which an energy carrier is burnt,
   a burner unit, in which thermal energy is produced by burning the combustion fluid,
   a turbine unit, in which a rotational movement is produced with the thermal energy, and
   a generator unit which is driven by the rotational movement to generate electrical power,
   wherein
   in order to provide an additional source for the heat supply, an electric heating unit is provided in addition to the reformer burning device, through which electric heating unit electrical energy is converted into heat energy, and
   a control unit is provided, with which a heating power of the electric heating unit is increased and a heating power of the reformer burning device is reduced, and vice versa.

2. The power plant as defined in claim 1
   wherein
   the combustion fluid which is produced with the reformer unit is synthesis gas.

3. The power plant as defined in claim 1,
   wherein
   the reformer unit comprises a coal gasification unit or coal liquefaction unit.

4. The power plant as defined in claim 1,
   wherein
   the reformer unit comprises a gas reformer, with which a gas is converted as an energy carrier into the combustion fluid.

5. The power plant as defined in claim 1,
   wherein
   the reformer unit has a heat exchanger, with which heat energy is transferred to the energy carrier,
   the heat exchanger is used both by the reformer burning device and by the electric heating unit to output heat energy.

6. The power plant as defined in claim 1,
   wherein
   the electric heating unit has electrical resistor elements to convert electrical energy into heat energy.

7. The power plant as defined in claim 1,
   wherein
   the electric heating unit has a plasma torch for heating a medium, from which heat is transferred to the energy carrier, in order to convert it into combustion fluid.

8. The power plant as defined in claim 1,
   wherein
   the electric heating unit has induction means to heat a medium and
   a heating power of the induction means is controlled by changing a magnetic resistance on the induction means.

9. The power plant as defined in claim 1,
   wherein
   the control unit is adapted, in dependence upon the available amount of electrical energy in an external power network, to increase the heating power of the electric heating unit and to reduce the heating power of the reformer burning device.

10. The power plant as defined in claim 1,
    wherein
    the heating powers of the electric heating unit and the reformer burning device is controlled in dependence upon each other by the control unit in such a way that the rate, at which combustion fluid is produced, remains constant or at most changes by a predefined maximum change rate.

11. The power plant as defined in claim 1, wherein the heating powers of the electric heating unit and reformer burning device is controlled in dependence upon each other by the control unit in such a way that a temperature in the reformer unit lies in a predefined target range, in which the energy carrier is converted into combustion fluid.

12. A method for generating electrical power, comprising the steps of:

converting an energy carrier in a reformer unit, with heat supply, into combustion fluid, burning an energy carrier with a reformer burning device to provide the heat supply, burning the combustion fluid in a burner unit to produce thermal energy, converting the thermal energy in a turbine unit into a rotational movement and driving a generator unit by the rotational movement and thus generating electrical power, wherein providing an additional heat supply by an electric heating unit, in addition to the heat supply of the reformer burning device, wherein the electric heating unit converts electrical energy into heat energy, increasing a heating power of the electric heating unit with a control unit and reducing a heating power of the reformer burning with the control unit, and vice versa.

* * * * *